United States Patent
Kagoshima et al.

(10) Patent No.: US 6,687,060 B2
(45) Date of Patent: Feb. 3, 2004

(54) READING OPTICAL SYSTEM

(75) Inventors: Kazuharu Kagoshima, Toyokawa (JP); Makoto Ooki, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 108 days.

(21) Appl. No.: 09/962,592

(22) Filed: Sep. 26, 2001

(65) Prior Publication Data

US 2002/0063973 A1 May 30, 2002

(30) Foreign Application Priority Data

Sep. 29, 2000 (JP) ...................................... 2000-298060

(51) Int. Cl.[7] .............................................. G02B 17/00
(52) U.S. Cl. ..................... 359/728; 359/727; 359/726
(58) Field of Search ................................ 359/726, 727, 359/728

(56) References Cited

U.S. PATENT DOCUMENTS

| | | | |
|---|---|---|---|
| 5,716,118 A | 2/1998 | Sato et al. ..................... 353/98 |
| 5,936,773 A | * 8/1999 | Togino ......................... 359/630 |
| 6,094,315 A | 7/2000 | Aoki ........................... 359/731 |
| 6,522,473 B2 | * 2/2003 | Takeyama ................... 359/631 |
| 2002/0063973 A1 | * 5/2002 | Kagoshima et al. ........ 359/726 |
| 2003/0076606 A1 | * 4/2003 | Ooki ........................... 359/857 |

FOREIGN PATENT DOCUMENTS

| JP | 7-333505 | 12/1995 | |
|---|---|---|---|
| JP | 11-249014 | 9/1999 | |
| JP | P2002-107631 A | * 4/2002 | ........... G02B17/08 |

* cited by examiner

Primary Examiner—David N. Spector
(74) Attorney, Agent, or Firm—Burns, Doane, Swecker & Mathis, LLP

(57) ABSTRACT

A reading optical system for projecting a document image on a CCD in an image reading device, providing, sequentially from the document side, a symmetrical lens group rotatable about the optical axis, and a free curved mirror. Reflective surface shape of the free curved mirror is symmetrical in a plane perpendicular to the linear layout direction of the line CCD and includes the intersection of the optical axis of the lens group and the reflective surface of the free curved mirror. The reflective surface shape of the free curved mirror is asymmetrical in a plane parallel to the linear layout direction of the line CCD and includes the normal line (NL) at the intersection. The number of lenses of the lens group structure can be reduced to three lenses while maintaining a high optical performance by using such a free curved mirror.

7 Claims, 10 Drawing Sheets

READING OPTICAL SYSTEM

RELATED APPLICATION

The present application claims priority to Japanese Patent Application No. 2000-298060 filed Sep. 29, 2000, the entire content of which is hereby incorporated by reference.

BACKGROUND OF THE INVENTION

1. Field of the Invention

The present invention relates to a reading optical system. For example, the present invention relates to a reading optical system suitable for an image reading device (particularly facsimile and digital copier) provided with a linear image sensing device such as a line CCD (charge-coupled device).

2. Description of the Related Art

Conventionally, refractive optical systems of the symmetrical type, e.g., Gauss type, Xenoter type, Orthometar type, mainly have been proposed as reading optical systems for image reading devices. There also have been various proposals for reading optical systems using an aspherical surface and these symmetrical type systems as a base. Japanese Laid-Open Patent Application No. H7-333505 discloses a reading optical system combining a reflective optical system and refractive optical system. The optical system proposed in Japanese Laid-Open Patent Application No. H7-333505 aims to provide a thin type optical system by arranging mirrors having optical power anteriorly and posteriorly to the refractive optical system, wherein the shape of the reflective surface of the mirrors is a free curve.

When meeting the demand for high speed and high density in recent years in symmetrical type optical systems, six or more lenses are inevitably required, with a resulting increase in cost. Even when using an aspherical surface on a symmetrical type system base, effectiveness beyond a certain degree cannot be obtained because the aspherical surface is formed on a refractive surface, and effectiveness is unexpectedly small when the aspherical surface is reduced to a single surface. The example cited in Japanese Laid-Open Patent Application No. H7-333505 is unclear about optical performance when the number of structural elements is greater than two mirrors and three lenses. Moreover, since it is unclear what shape the reflective surface uses, the degree of effectiveness obtained thereby is also unclear.

SUMMARY OF THE INVENTION

The present invention provides a reading optical system which reduces the number of lenses while maintaining optical performance by effectively using a free curved mirror which has a free curved reflective surface.

In one embodiment of the invention, there is a reading optical system for projecting a document image on a linear image sensing device. The reading optical system has one or more mirrors and a symmetrical lens group rotatable relative to the optical axis of the reading optical system; wherein the lens group includes sequentially from the object side a positive lens, negative lens, positive lens; the mirror faces a reflective concave surface on the object side; the shape of the reflective surface of the mirror is symmetrical relative to a plane perpendicular to the layout direction of the image sensing device and includes the intersection of the mirror reflective surface and the optical axis of the lens group; and the shape of the reflective surface of the mirror is asymmetrical relative to a plane parallel to the layout direction of the image sensing device and includes the normal line of the mirror at the intersection.

The invention itself, together with further objects and attendant advantages, will be best understood by reference to the following detailed description taken in conjunction with the accompanying drawings.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
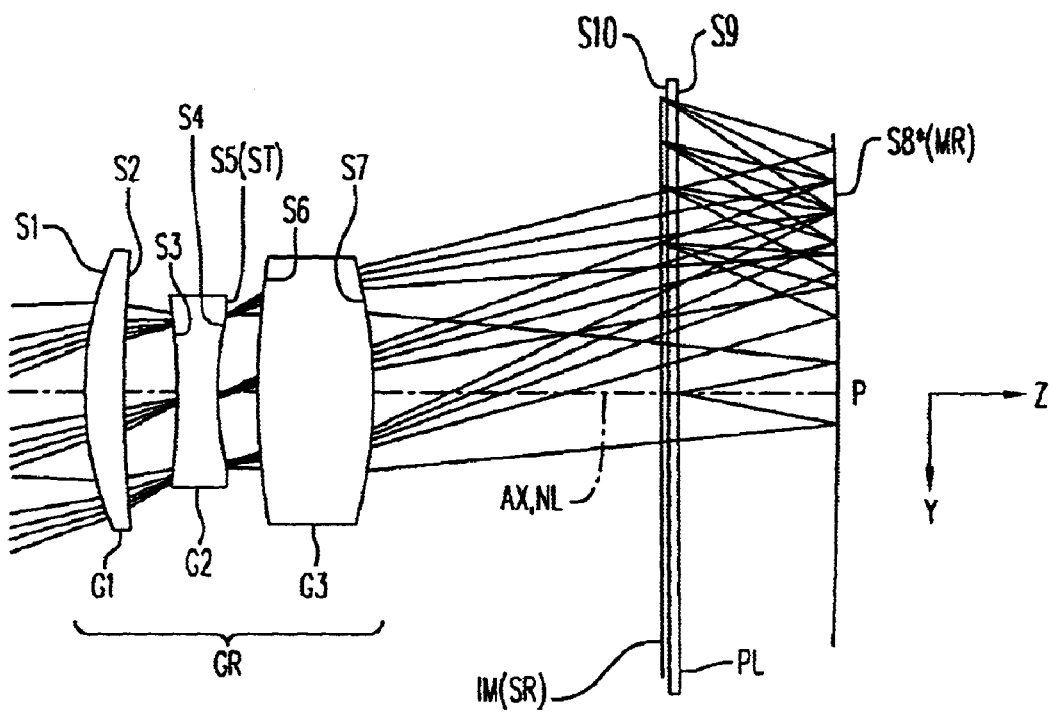
FIG. 1 shows the YZ cross section of an embodiment of the reading optical system.
Figure 2:
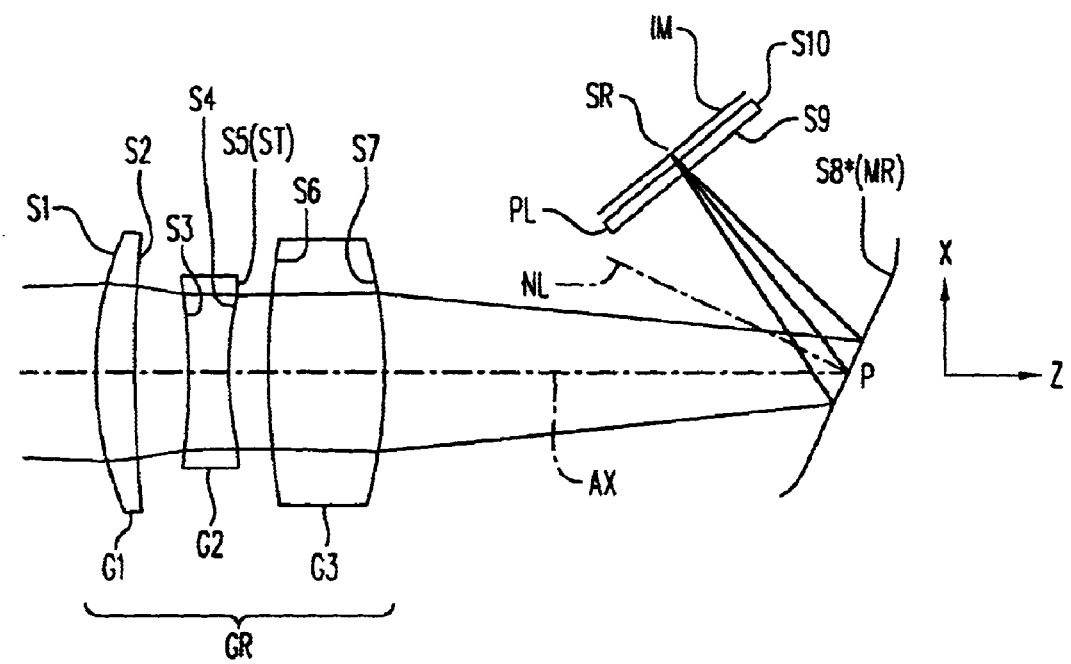
FIG. 2 shows the XZ cross section of an embodiment of the reading optical system.

The embodiments of the reading optical system of the present invention are described hereinafter with reference to the drawings. FIGS. 1 and 2 show the optical structure of an embodiment of the reading optical system; FIG. 1 shows the optical structure in the YZ cross section in mutually intersecting X, Y, and Z directions, and FIG. 2 shows the optical structure in the XZ cross section. In FIGS. 1 and 2, surfaces with the Si (i=1, 2, 3, . . . ) appended are the No. i surface counting from the object side (i.e., document side), and surface (S8) with the star symbol appended is a reflective mirror surface having a free curve.

This embodiment is a reading optical system used in an image reading device (facsimile, digital copier or the like) provided with a line CCD (SR) as a linear image sensing device, and has arranged, sequentially from the object side, a symmetrical lens group (GR) rotatable relative to the optical axis (AX), and a free curved mirror (MR). The lens group (GR) has, sequentially from the object side, a first lens (G1) comprising a concave positive meniscus lens element on the object side, a second lens (G2) comprising a biconcave negative meniscus lens element, a stop (ST), and a third lens (G3) comprising a biconvex positive lens element. The reflective surface (S8) of the free curved mirror (MR) comprises a free curved surface having a concave shape on the object side. The plate (PL) disposed nearest the image plane (IM) side is a cover glass of the line CCD (SR). In this image reading device, a document image is reduced and projected for reading on the line CCD (SR). The optical axis (AX) of the lens group (GR) is parallel to the Z direction, and perpendicular to the XY plane. The linear layout direction (i.e., a direction in line with the photoreceptor element comprising each pixel) of the line CCD (SR) is parallel to the Y direction.

Figure 10:
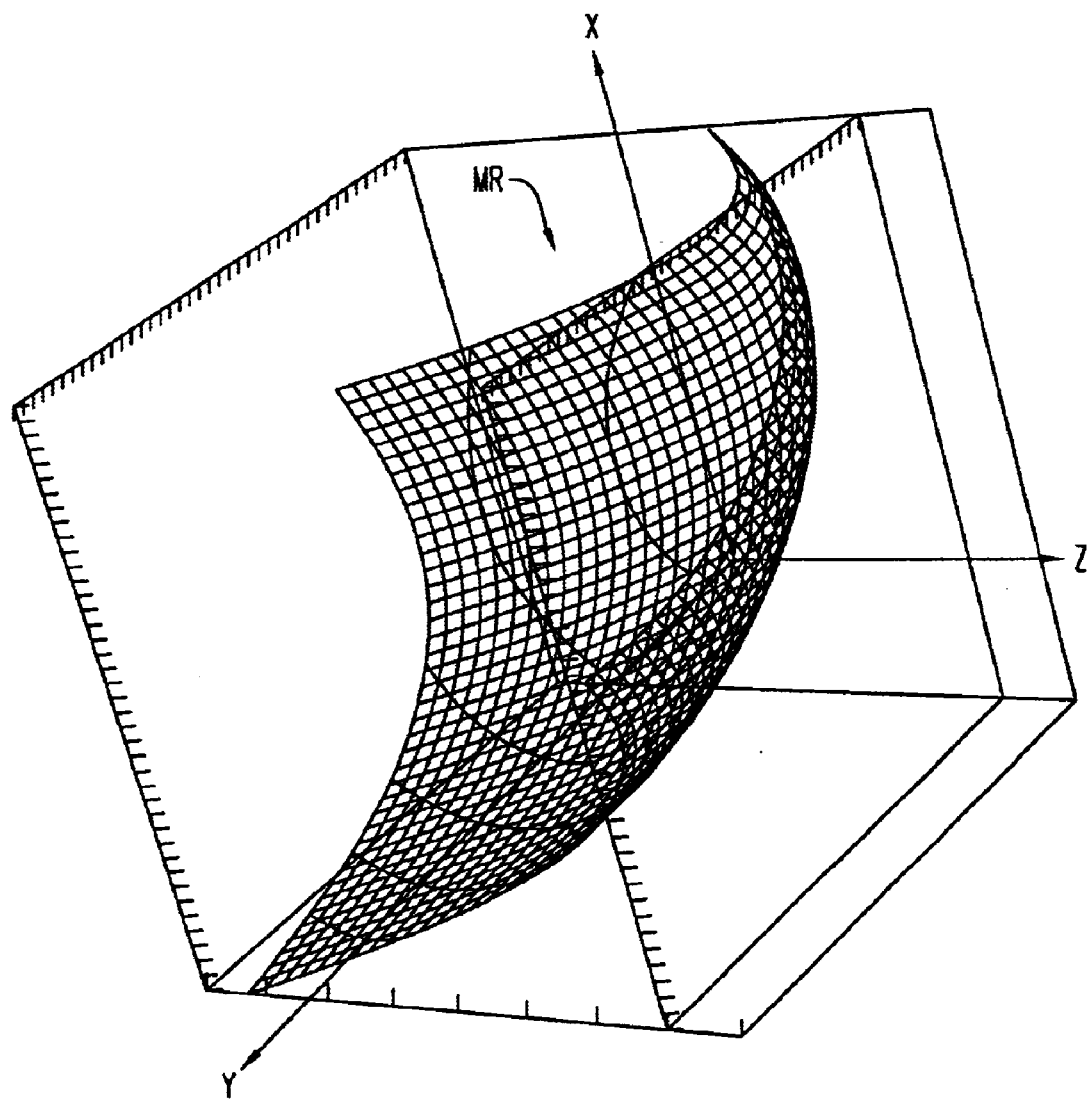
FIG. 10 is a perspective view showing the shape of the reflective surface of the free curved mirror.
Figure 11:
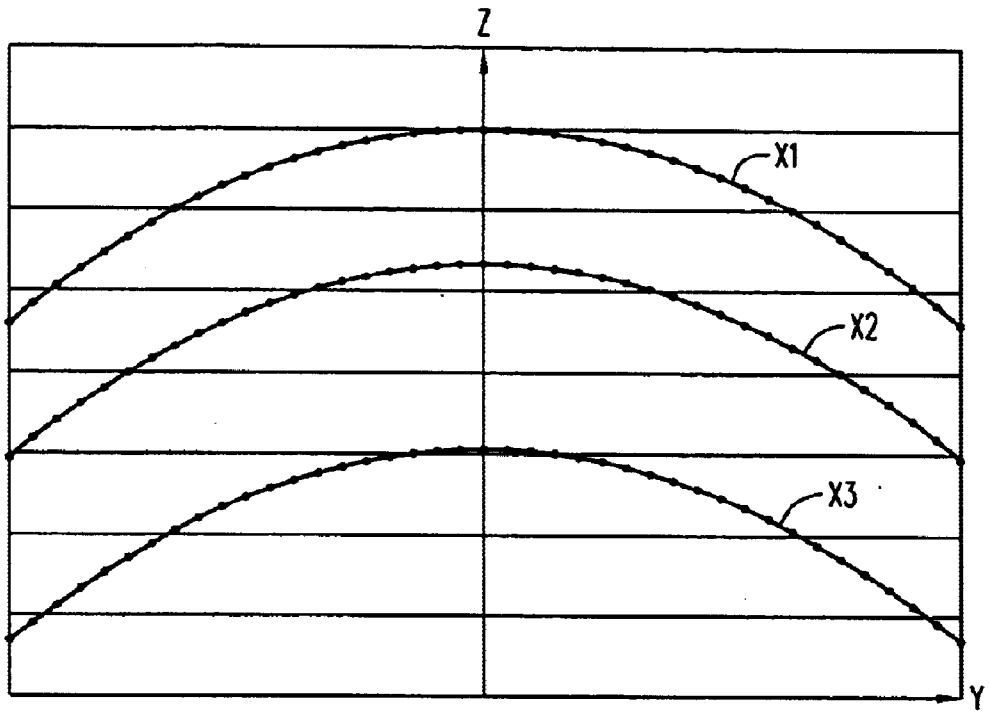
FIG. 11 shows the YZ cross section shape of the reflective surface of the free curved mirror.
Figure 12:
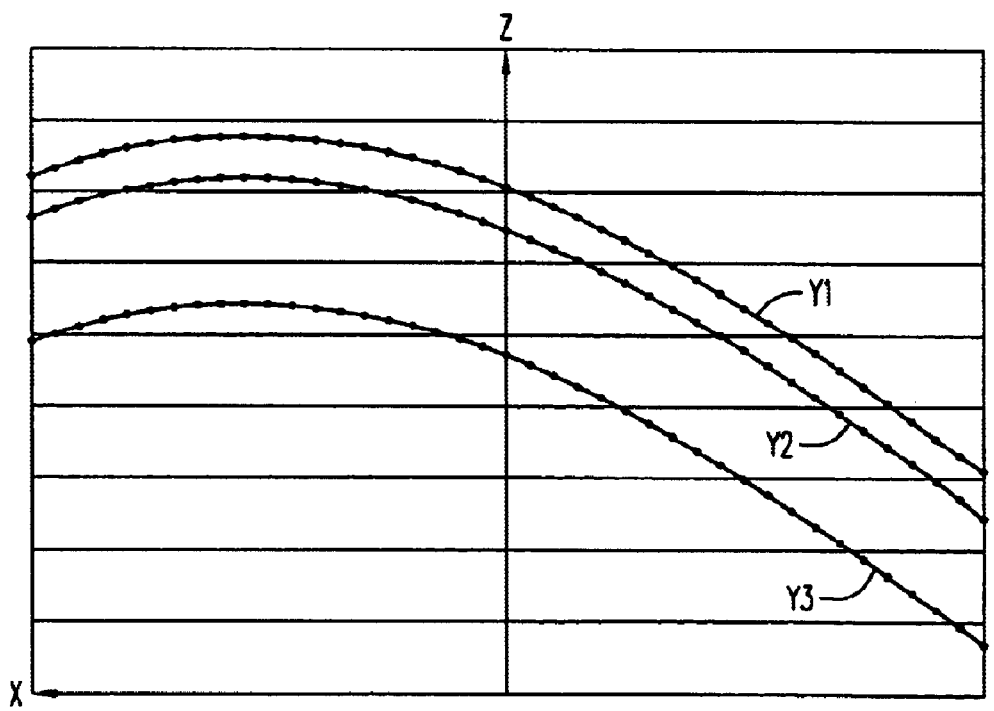
FIG. 12 shows the XZ cross section shape of the reflective surface of the free curved mirror.

FIG. 10 three-dimensionally shows the shape of the reflective surface of the free curved mirror (MR). The reflective surface shape shown in FIG. 10 enlarges size in the Z direction. FIG. 11 shows the shape of the YZ cross section of the reflective surface of the free curved mirror (MR), and FIG. 12 shows the shape of the XZ cross section of the reflective surface of the free curved mirror (MR). The horizontal axis range in FIG. 11 is equivalent to the mirror effective range, the curve X1 represents the YZ cross section near the center in the X direction, curve X2 represents the YZ cross section in the intermediate range in the X direction, and curve X3 represents the YZ cross section near the periphery in the X direction. The horizontal axis range in FIG. 12 is equivalent to the mirror effective range (the image plane (TM) side facing the left side), the curve Y1 represents the XZ cross section near the center in the Y direction, curve Y2 represents the XZ cross section in the intermediate range in the Y direction, and curve Y3 represents the XZ cross section near the periphery in the Y direction.

As can be understood from FIGS. 1 and 2, and FIGS. 10–12, the free curved surface shape of the free curved mirror (MR) is symmetrical in a plane (XZ plane) perpendicular to the linear layout direction (Y direction) of the line CCD (SR) and includes the intersection (P) of the optical axis (AX) of the lens group (GR) and the reflective surface (S8) of the free curved mirror (MR), and the reflective surface shape of the free curved mirror (MR) is asymmetrical in a plane parallel to the linear layout direction (Y direction) of the line CCD (SR) and includes the normal line (NL) at the intersection (P). This asymmetry means the optical power of the reflective surface (S8) is different (i.e., the curvature changes) on the image plane (IM) side and the reflective side bordering the intersection (P). Furthermore, the optical power of the free curved mirror (MR) at the cross section (main cross section shown in FIG. 1: YZ cross section) parallel to the linear layout direction (Y direction) of the line CCD (SR), and the optical power of the free curved mirror (MR) at the cross section (sub cross section shown in FIG. 2: XZ cross section) perpendicular to the linear layout direction (Y direction) of the line CCD (SR) are both positive optical powers.

In an optical structure which bends reading flux (convergent flux or divergent flux) by mirror reflection as in the present embodiment, within the XZ cross section intersecting the linear layout direction (Y direction) of the line CCD (SR), the relationship of the impingement and reflection of each extra-axial ray within the reading flux is naturally asymmetrical to the normal line (NL). Accordingly, the reflective surface shape must have the aforesaid asymmetry for good distortion correction. Furthermore, in order to reduce the optical power burden on the lens group (GR), it is desirable that the optical power of the reflective surface (S8) of the free curved mirror (MR) is positive in both the main cross section (YZ cross section) and sub cross section (XZ cross section) as described above. The number of lenses can be effectively reduced by providing both cross sections with positive optical power. Furthermore, aberration (mainly distortion, astigmatism, and curvature of field) correction is excellent even at a wide field angle since the flux corresponding to image height becomes more separated when it impinges the free curved mirror (MR) by arranging the free curved mirror (MR) outside (i.e., on the image side or the object side) the lens group (GR).

If the one or more free curved mirrors (MR) is used effectively as described above, the number of lenses can be reduced while maintaining optical performance. For example, approximately six lenses are necessary when using only a refractive spherical surface system, whereas the number of lenses can be reduced to approximately three lenses as in the present embodiment while maintaining optical performance. If this reading optical system is used in an image reading device such as a facsimile, digital copier and the like, the image reading device can be made compact, and at low cost while achieving high performance.

EXAMPLES

The construction data of the reading optical system of the present invention is specifically described below in TABLE 1. These examples project a reduced image of an A3 document on a line CCD having a pixel pitch of 7 μm. The reading optical system has a corresponding reading density of 600 dpi. The lens structure of the previously described embodiment (FIGS. 1 and 2) represents the lens structure of the present examples in the YZ cross section and XZ cross section. In the construction data of the present examples, Si (i=1, 2, 3, . . . ) represents the No. i surface counting from the object side, ri (i=1, 2, 3, . . . ) represents the radius of curvature (mm) of the surface Si, and di (i=1, 2, 3, . . . ) represents the No. i axial distance (mm) counting from the object side. Glass refraction index (NC, Nd, Ne, NF, Ng) is shown at each wavelength together with projection magnification, F number (FNO), and distance between an object and an image. The C-line wavelength is λC=656.28 nm, the d-line wavelength is λd=587.56 nm, the e-line wavelength is λe=546.07 nm, the F-line wavelength is λF=486.18 nm, and the g-line wavelength is kg=435.84 nm.

The surface (S8) with a star symbol appended is free curved surfaces. The shape of the free curved surface is defined by the equation below when considering a local orthogonal coordinate system (x,y,z) having the surface apex of the free curved surface (S8) as the origin. The x,y,z directions in the orthogonal coordinate system (x,y,z) respectively match the X,Y,Z directions in the global orthogonal coordinate system (X,Y,Z). The surface shape stipulated in the equation below represents a condition of the front of the surface (S8) inclined by rotation (rotation angle=25° having the XY plane as reference) about an axis in the Y direction having a center at the intersection point (P). The data of the free curved surface of the example are shown together with other data.

$$z = ch_2 / \left[1 + \sqrt{1-(1+K)c^2h^2}\right] + \sum_{j=2}^{66} c_j x^m y^n$$

Where z represents the displacement (sag) in the z-axis direction at the height h position, h represents the height ($h^2=x^2+y^2$) in a direction perpendicular to the z-axis, c represents paraxial curvature (=1/ri), and Cj represents the $x^m y^n$ coefficient (j=[(m+n)$^2$+m+3n]/2+1).

Figure 3:
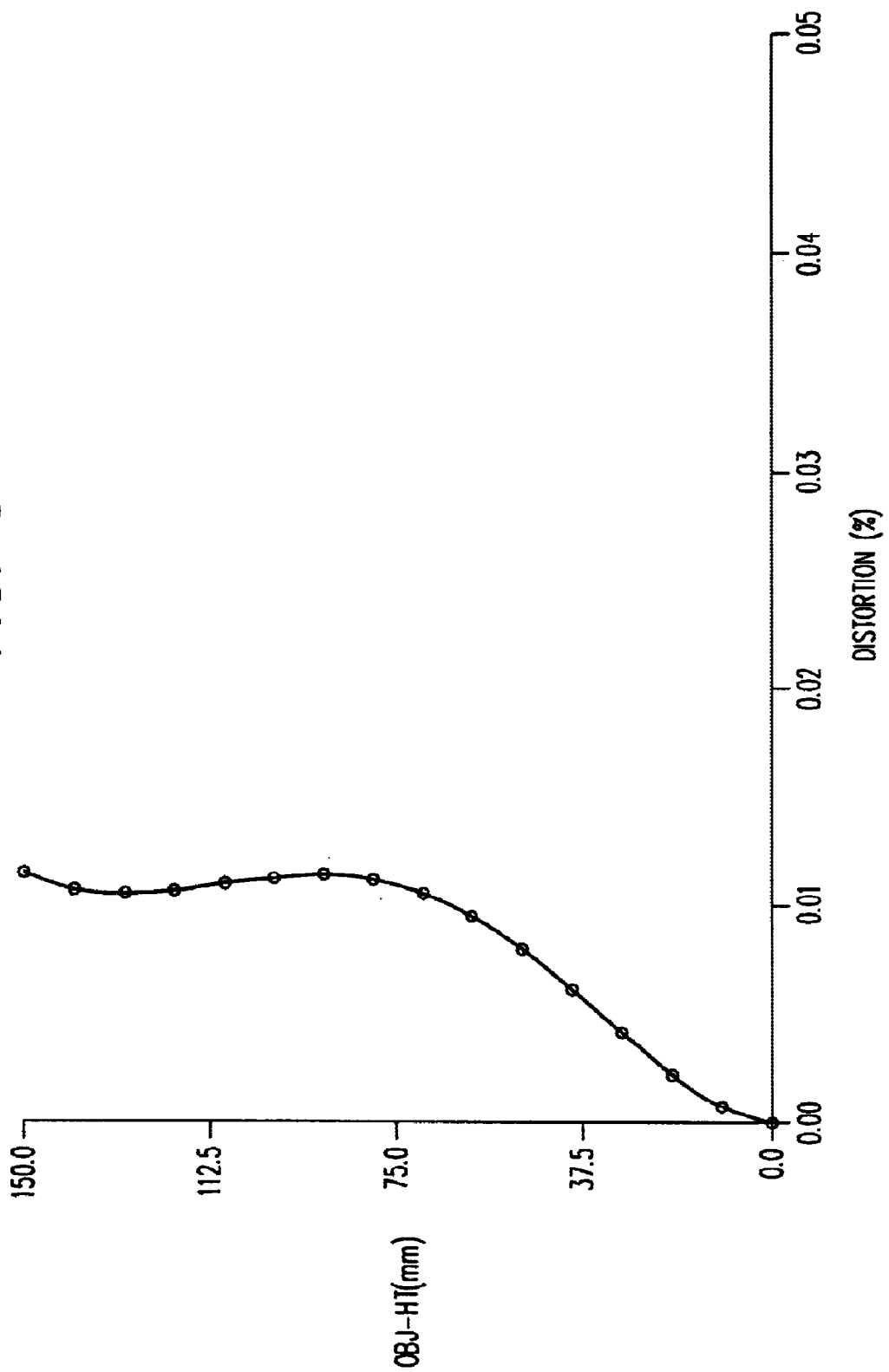
FIG. 3 shows the distortion in the embodiment.
Figure 4:
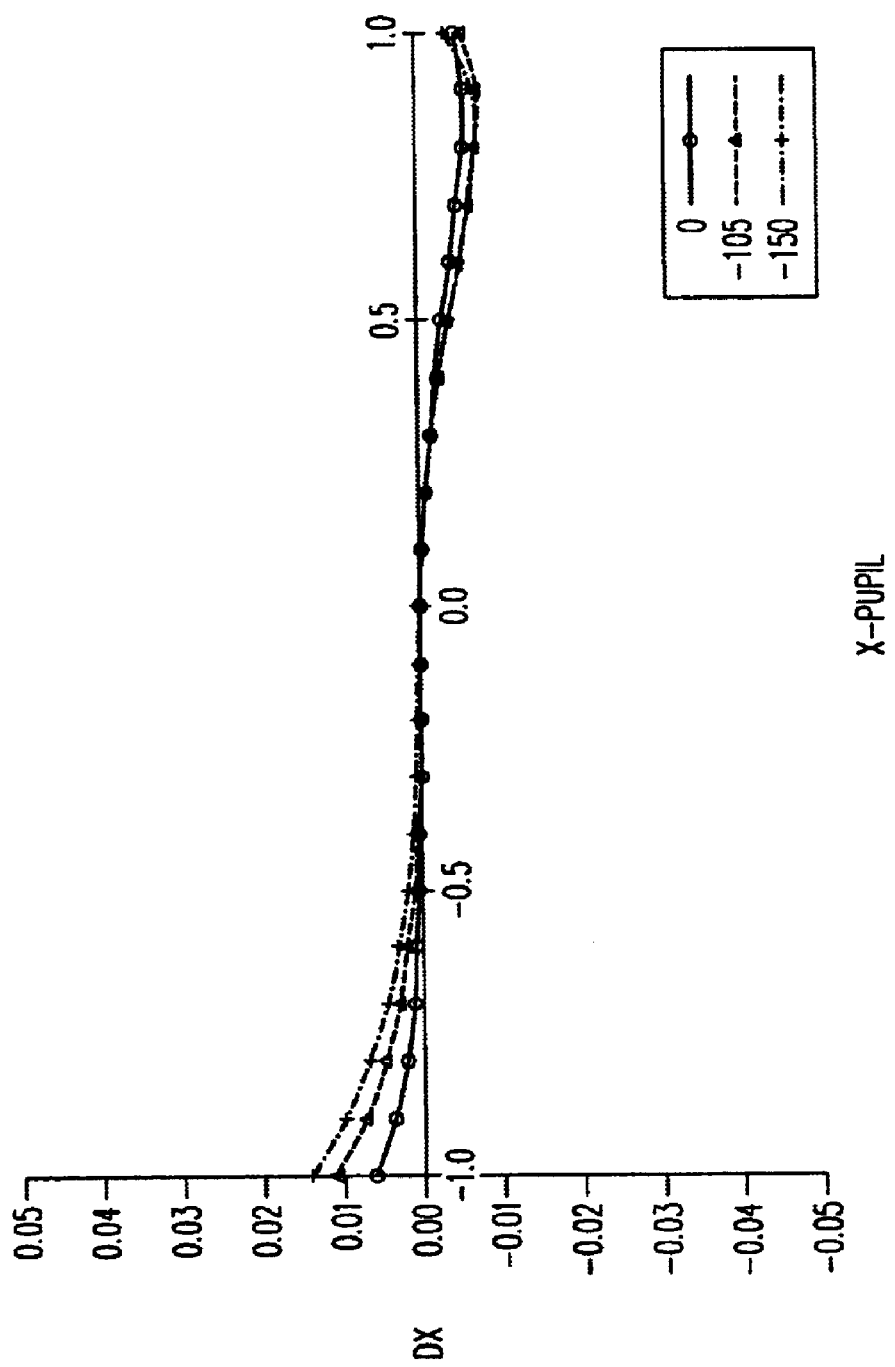
FIG. 4 shows lateral aberration in the X-direction relative to the e-line in the embodiment.
Figure 5:
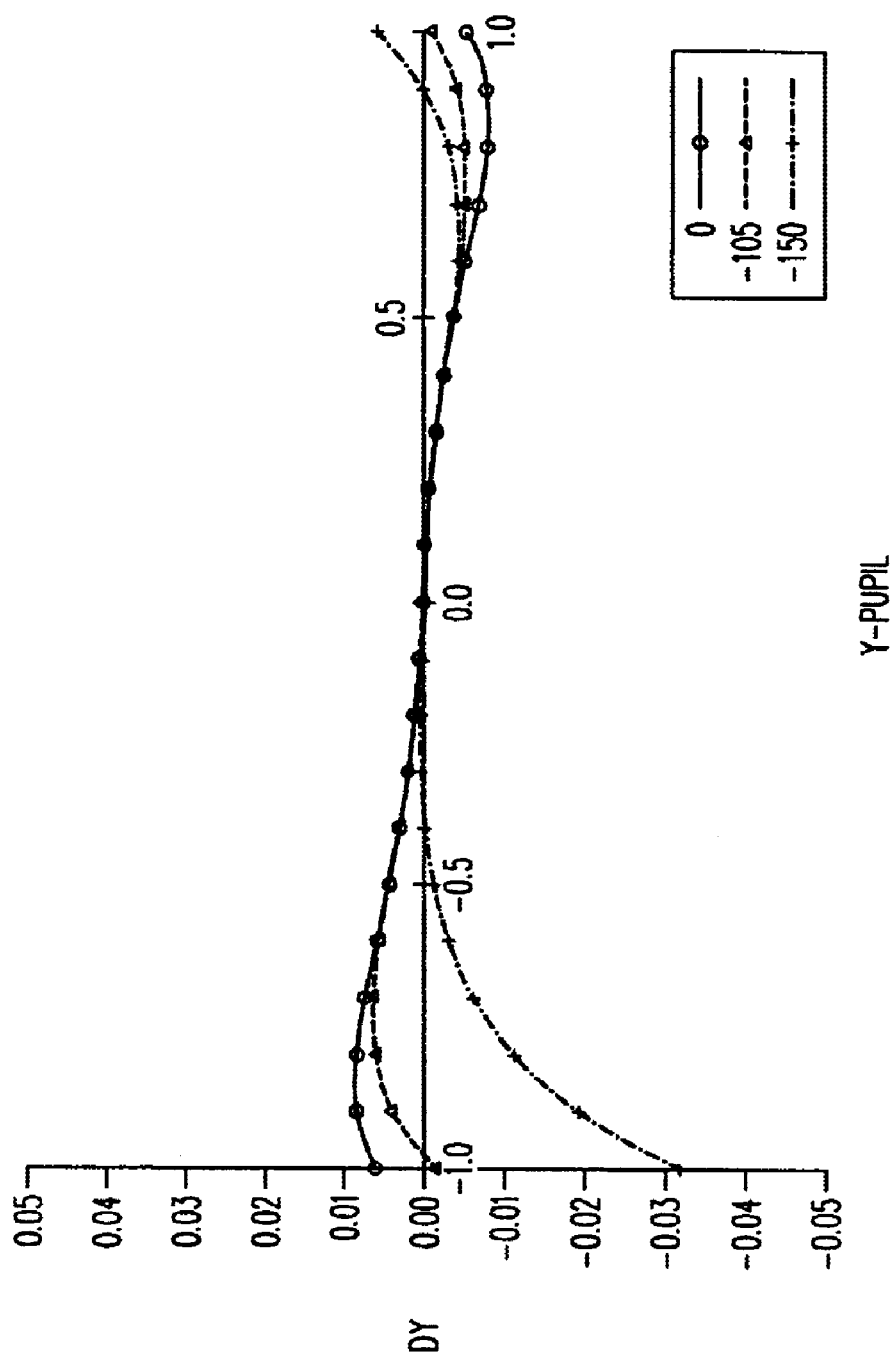
FIG. 5 shows lateral aberration in the Y-direction relative to the e-line in the embodiment.
Figure 6:
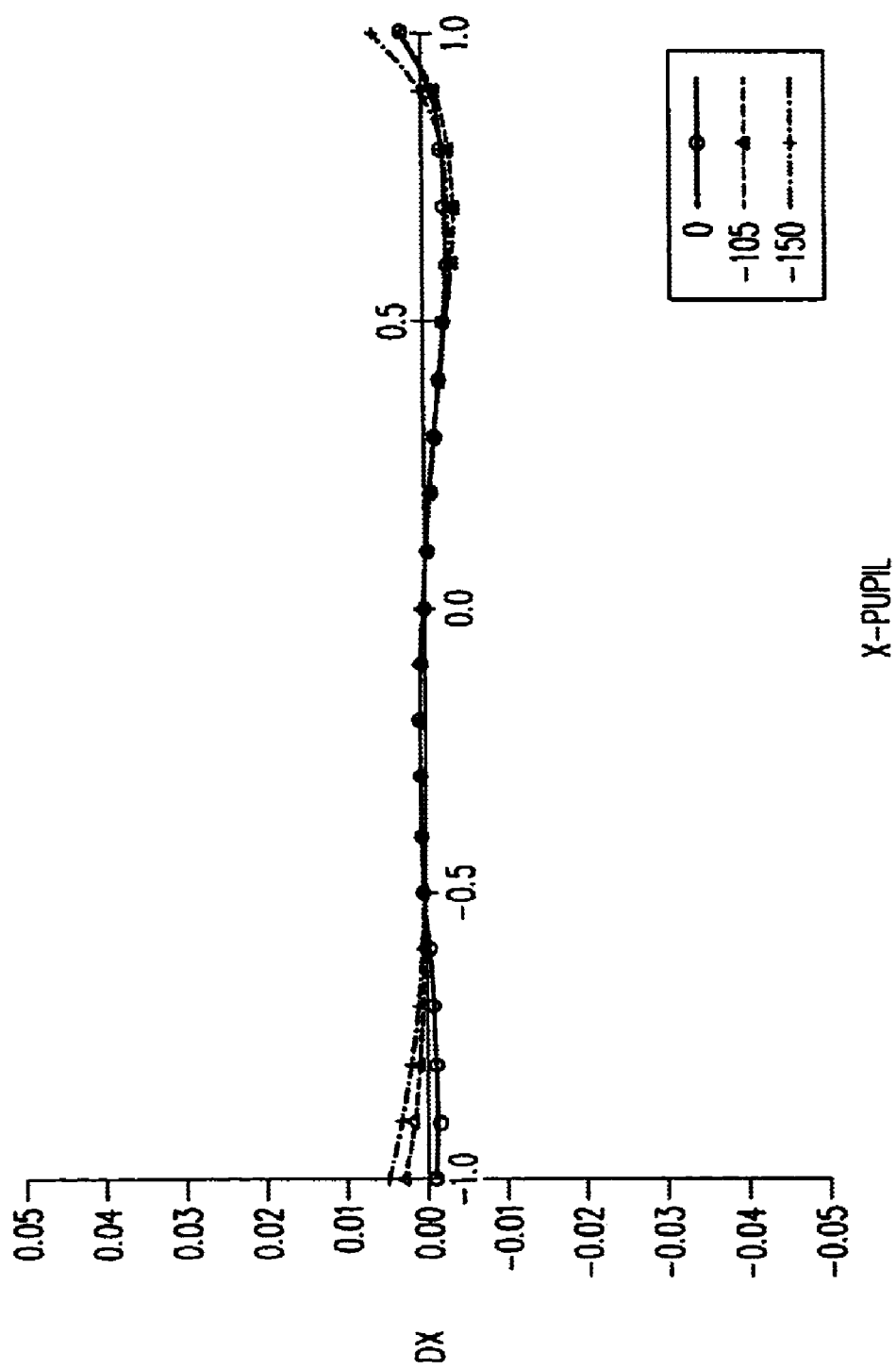
FIG. 6 shows lateral aberration in the X-direction relative to the F-line in the embodiment.
Figure 7:
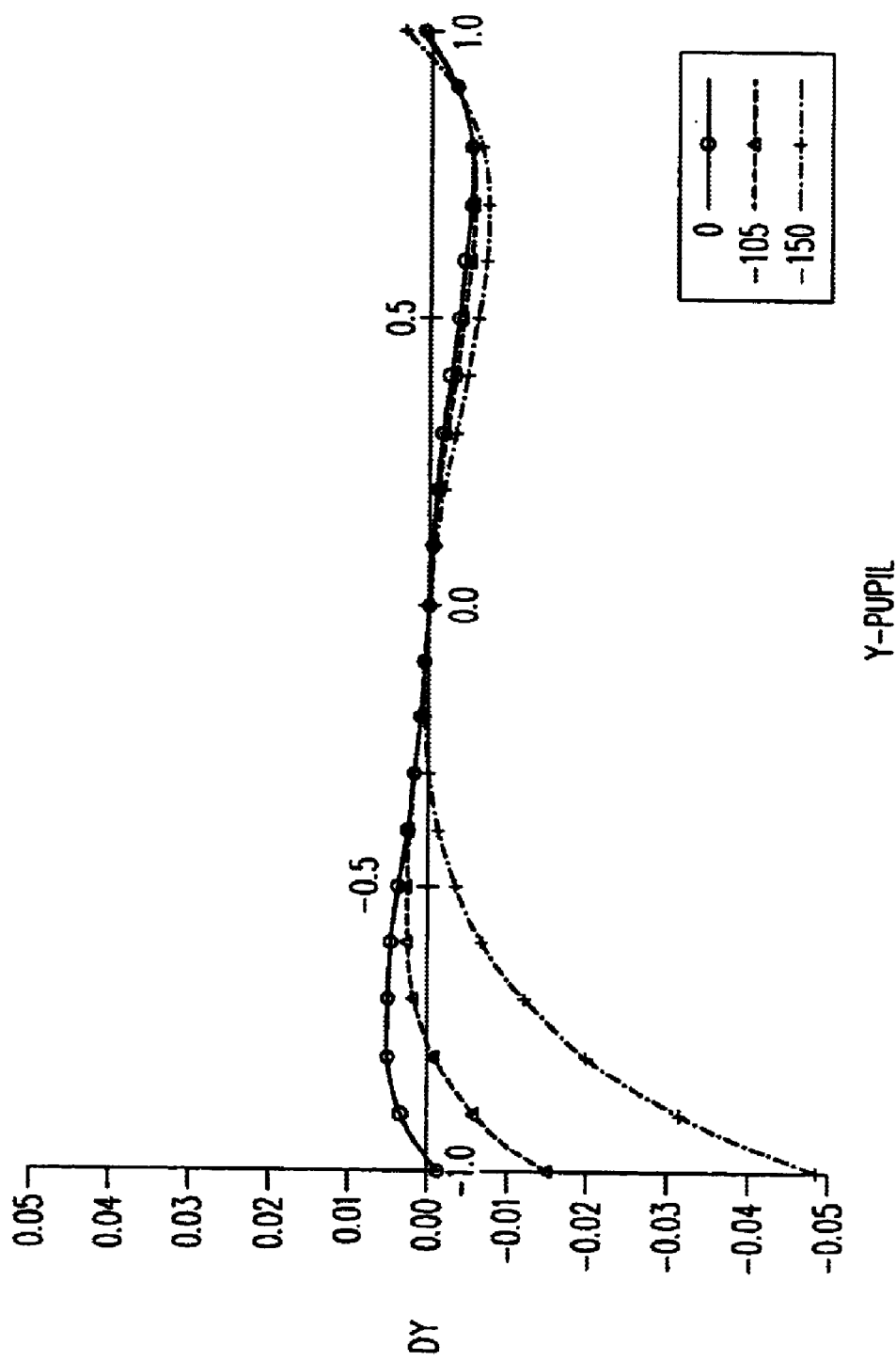
FIG. 7 shows lateral aberration in the Y-direction relative to the F-line in the embodiment.
Figure 8:
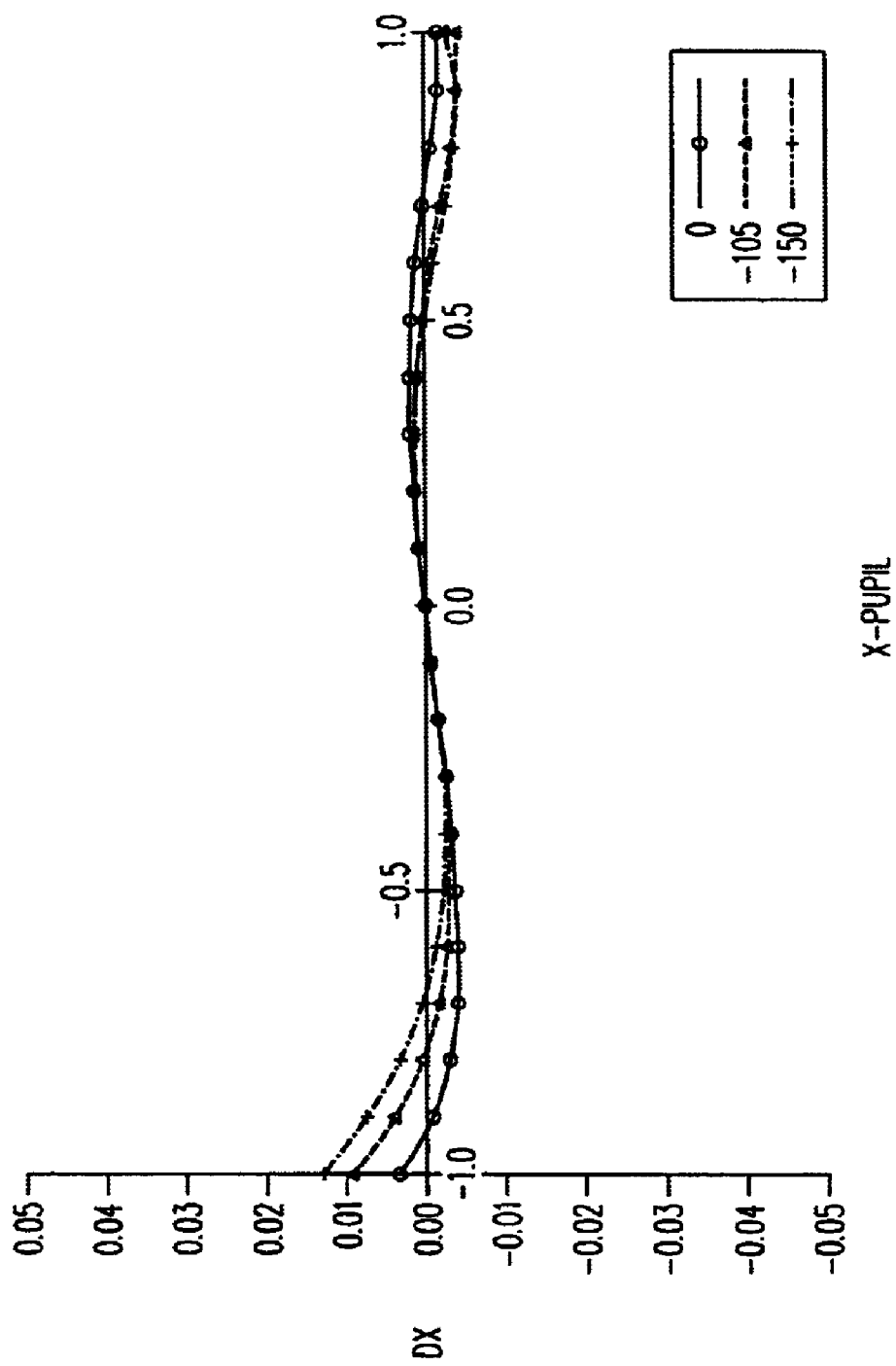
FIG. 8 shows lateral aberration in the X-direction relative to the C-line in the embodiment.
Figure 9:
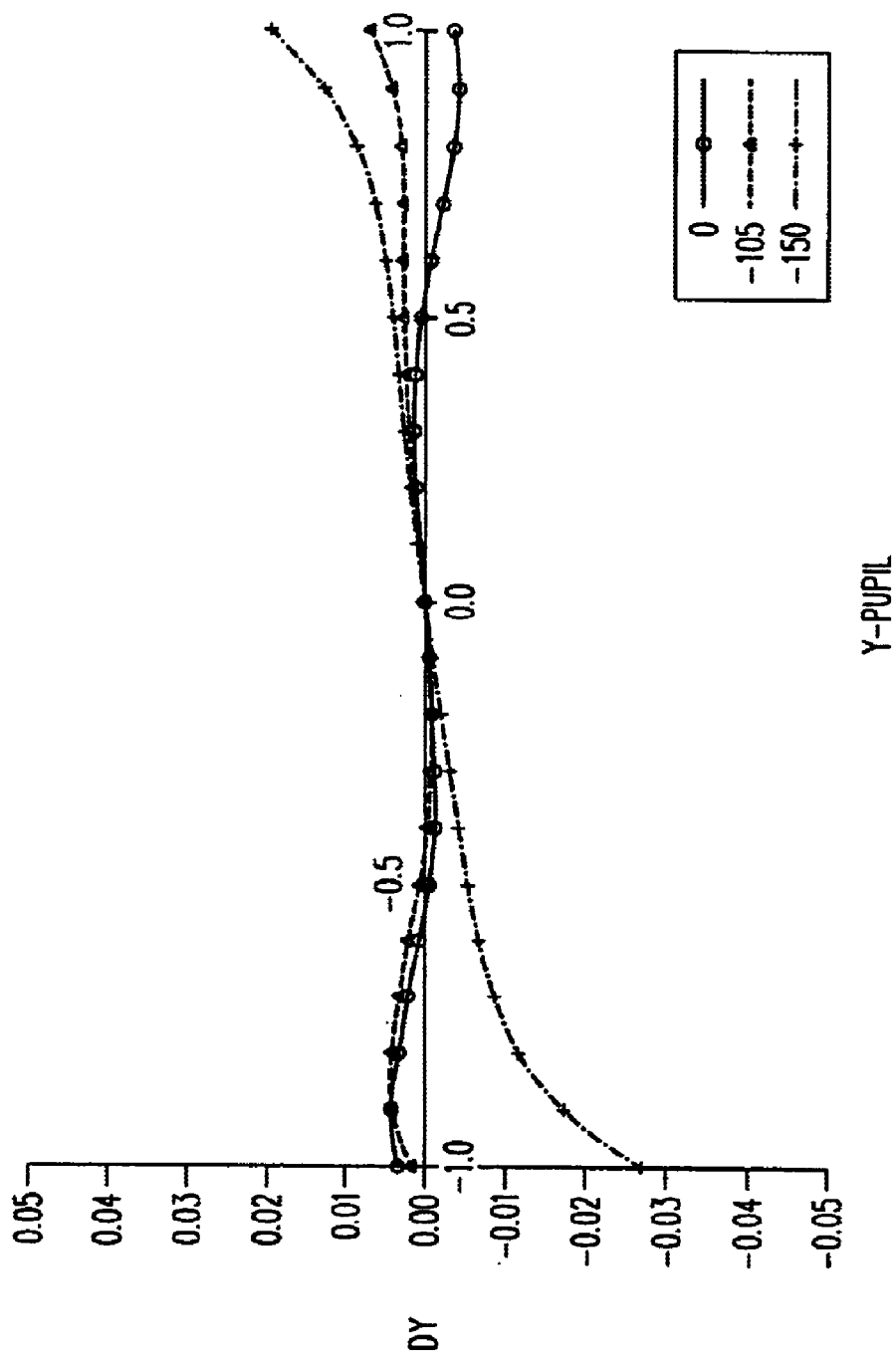
FIG. 9 shows lateral aberration in the Y-direction relative to the C-line in the embodiment.

FIG. 3 is a diagram showing the distortion of the examples; the horizontal axis shows the distortion (%) relative to the e-line (λe=546.1 nm), and the vertical axis shows the object height (OBJ-HT in mm). FIGS. 4–9 show lateral aberration. FIGS. 4 and 5 show lateral aberration relative to the e-line (λe=546.1 nm), FIGS. 6 and 7 show lateral aberration relative to the F-line (λF=486.1 nm), and FIGS. 8 and 9 show lateral aberration relative to the C-line (λC=656.8 nm). FIGS. 4 and 6 and FIGS. 8 and 9 show lateral aberration (DX) in the X direction, and FIGS. 5 and 7 and FIG. 9 show lateral aberration (DY) in the Y direction. In each lateral aberration diagram, the solid line (plot: o) represents lateral aberration at image height 0 (mm), and the dotted line (plot: □) represents lateral aberration at object height 105 (mm), and the single dot chain line (plot: +) represents lateral aberration at image height 150 (mm).

TABLE 1

Construction Data of Example
Projection Magnification = −0.16535
FNO = 4.0
Distance between an object and an image = 496 (mm)

| Surface No. | Radius of Curvature | Axial Distance | Glass |
|---|---|---|---|
| S1 | r1 = 28.897 | | |
| | | d1 = 3.37 | GC-A |
| S2 | r2 = 143.604 | | |
| | | d2 = 4.73 | |
| S3 | r3 = −74.509 | | |
| | | d3 = 3.39 | GC-B |
| S4 | r4 = 30.314 | | |
| | | d4 = 0.69 | |
| S5 | r5 = ∞(ST) | | |
| | | d5 = 2.98 | |
| S6 | r6 = 79.933 | | |
| | | d6 = 9.78 | GC-C |
| S7 | r7 = −46.967 | | |
| | | d7 = 40.00 | |
| S8* | r8 = −473.255 (Reflective Surface, rotatation 25° on the intersection P around the Y-axis) | d8 = 22.00 | |
| S9 | r9 = ∞ | | |
| | | d9 = 1.00 | GC-D |
| S10 | r10 = ∞ | | |

<Refractive Index>

| [Glass] | [C-line NC] | [d-line Nd] | [e-line Ne] | [F-line NF] | [G-line Ng] |
|---|---|---|---|---|---|
| GC-A | 1.797480 | 1.803359 | 1.808078 | 1.817368 | 1.828817 |
| GC-B | 1.772579 | 1.781123 | 1.788130 | 1.802268 | 1.820297 |
| GC-C | 1.797676 | 1.802856 | 1.806983 | 1.815039 | 1.824852 |
| GC-D | 1.514320 | 1.516800 | 1.518720 | 1.522370 | 1.526670 |

<Data of Free Curved Surface S8>

Paraxial Power(in YZ cross section) = $4.7 \times 10^{-3}$
Paraxial Power(in XZ cross section) = $3.8 > 10^{-3}$
1/c = −473.255
K = 0
C2 = $2.4819 \times 10^{-3}$:x coefficient
C4 = $1.0126 \times 10^{-4}$:$x^2$ coefficient
C6 = $-1.1236 \times 10^{-4}$:$y^2$ coefficient
C7 = $-2.1274 \times 10^{-5}$:$x^3$ coeffcient
C9 = $8.5503 \times 10^{-6}$:$xy^2$ coefficient
C11 = $4.1821 \times 10^{-6}$:$x^4$ coefficient
C13 = $1.5897 \times 10^{-6}$:$x^2y^2$ coefficient
C15 = $5.9699 \times 10^{-7}$:$y^4$ coefficient
C16 = $2.9310 \times 10^{-7}$:$x^5$ coefficient
C18 = $-6.3716 \times 10^{-9}$:$x^3y^2$ coefficient
C20 = $-1.0347 \times 10^{-8}$:$xy^4$ coefficient
C21 = $-3.6219 \times 10^{-9}$:$y^5$ coefficient
C22 = $-3.0640 \times 10^{-7}$:$x^6$ coefficient
C24 = $-1.8562 \times 10^{-8}$:$x^4y^2$ coefficient
C26 = $-4.7579 \times 10^{-10}$:$x^2y^4$ coefficient
C28 = $-1.3404 \times 10^{-11}$:$y^6$ coefficient According to the embodiments described above, the use of a free curved mirror is effective in reducing the number of lenses while maintaining the optical performance of the reading optical system. If the reading optical system of the present invention is used in an image reading device such as a facsimile, digital copier and the like, the image reading device can be made compact, and at low cost while achieving high performance. Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A reading optical system for projecting a document image on a linear image sensing device, said reading optical system comprising:

a symmetrical lens group rotatable relative to the optical axis of said reading optical system; and a mirror having a free curved reflective surface, wherein the shape of the reflective surface of said mirror is symmetrical relative to a plane perpendicular to the layout direction of the linear image sensing device and includes an intersection of the reflective surface of said mirror and the optical axis of said lens group; and the shape of the reflective surface of said mirror is asymmetrical relative to a plane parallel to the layout direction of the linear image sensing device and includes the normal line of said mirror at the intersection.

2. A reading optical system according to claim 1, wherein the optical power of said mirror at the cross section parallel to the layout direction of the linear image sensing device, and the optical power of said mirror at the cross section perpendicular to the layout direction are both.

3. An optical system for projecting an image on a linear image sensing device, said optical system comprising:

a symmetrical lens group rotatable relative to the optical axis of the optical system; and a mirror having a free curved reflective surface, wherein the shape of the reflective surface of said mirror is symmetrical relative to a plane perpendicular to the layout direction of the linear image sensing device and includes an intersection of the reflective surface of said mirror and the optical axis of said lens group; and the shape of the reflective surface of the mirror is asymmetrical relative to a plane parallel to the layout direction of the linear image sensing device and includes the normal line of said mirror at the intersection.

4. An optical system according to 3, wherein said mirror is arranged outside of said lens group.

5. An optical system according to claim 3, wherein said mirror is arranged at an image side of said lens group.

6. An optical system according to claim 3, wherein the optical power of said mirror at the cross section parallel to the layout direction of the linear image sensing device, and the optical power of said mirror at the cross section perpendicular to the layout direction are both positive.

7. A reading optical system for projecting a document image on a linear image sensing device, said reading optical system comprising:

a symmetrical lens group rotatable relative to the optical axis of the reading optical system; and a mirror having a free curved reflective surface, wherein
said lens group includes sequentially from the object side a positive lens, negative lens, and positive lens;
said mirror faces a reflective concave surface on the object side;
the shape of the reflective surface of said mirror is symmetrical relative to a plane perpendicular to the layout direction of the linear image sensing device and includes an intersection of the reflective surface of said mirror and the optical axis of said lens group; and the shape of the reflective surface of said mirror is asymmetrical relative to a plane parallel to the layout direction of the linear image sensing device and includes the normal line of said mirror at the intersection.

* * * * *